(12) United States Patent
Arbeiter et al.

(10) Patent No.: US 6,295,322 B1
(45) Date of Patent: Sep. 25, 2001

(54) PROCESSING APPARATUS FOR SYNTHETICALLY EXTENDING THE BANDWIDTH OF A SPATIALLY-SAMPLED VIDEO IMAGE

(75) Inventors: James Henry Arbeiter, Hopewell; Roger Frank Bessler, Lawrenceville, both of NJ (US)

(73) Assignee: North Shore Laboratories, Inc., Hopewell, NJ (US)

( * ) Notice: Subject to any disclaimer, the term of this patent is extended or adjusted under 35 U.S.C. 154(b) by 0 days.

(21) Appl. No.: 09/112,539

(22) Filed: Jul. 9, 1998

(51) Int. Cl.[7] .............................. H04N 5/14; G09G 5/00
(52) U.S. Cl. .................. 375/240.29; 348/625; 708/300; 708/313
(58) Field of Search .................... 375/240.29; 348/625; 708/300, 313

(56) References Cited

U.S. PATENT DOCUMENTS

| | | | |
|---|---|---|---|
| 5,355,328 | * 10/1994 | Arbeiter et al. | 708/313 |
| 5,483,474 | * 1/1996 | Arbeiter et al. | 708/313 |
| 5,977,947 | * 11/1999 | Potu | 345/127 |
| 6,167,414 | * 12/2000 | Schwartz | 708/300 |

OTHER PUBLICATIONS

Topics in Applied Physics: Picture Processing and Digital Filtering, T. S. Huang, pp. 227–229; Springer–Verlag, New York 1979, vol. 6.*

* cited by examiner

Primary Examiner—Howard Britton
(74) Attorney, Agent, or Firm—George J. Seligsohn

(57) ABSTRACT

An input data stream of pixel values, representing an original video image having predetermined horizontal and vertical resolutions that has been spatially sampled at a first spatial sampling frequency, is upsampled and interpolated to derive an output data stream of interpolated pixel values at a second spatial sampling frequency that represents an oversampled video image that has been enlarged in size with respect to the original video image but has the same full bandwidth as the original video image. The pixel values of the input data stream and the interpolated pixel values of this output data stream are both employed to synthetically derive the interpolated pixel values of a correction-waveform data stream that defines spatial frequencies that are higher in frequency than the highest frequency in the full bandwidth of the original video image. A data stream representing an extended-full-bandwidth enlarged video image is derived by summing corresponding interpolated pixel values of the correction-waveform data stream and the data stream representing the oversampled enlarged video image. In this manner, the sharpness of the edge information of the original video image is preserved in the extended-full-bandwidth enlarged video image. Optionally, the data stream representing the extended-full-bandwidth enlarged video image may be further processed to synthetically add a drop shadow effect to a displayed enlarged video image, which provides perspective that enhances the appearance of the displayed enlarged video image.

25 Claims, 11 Drawing Sheets

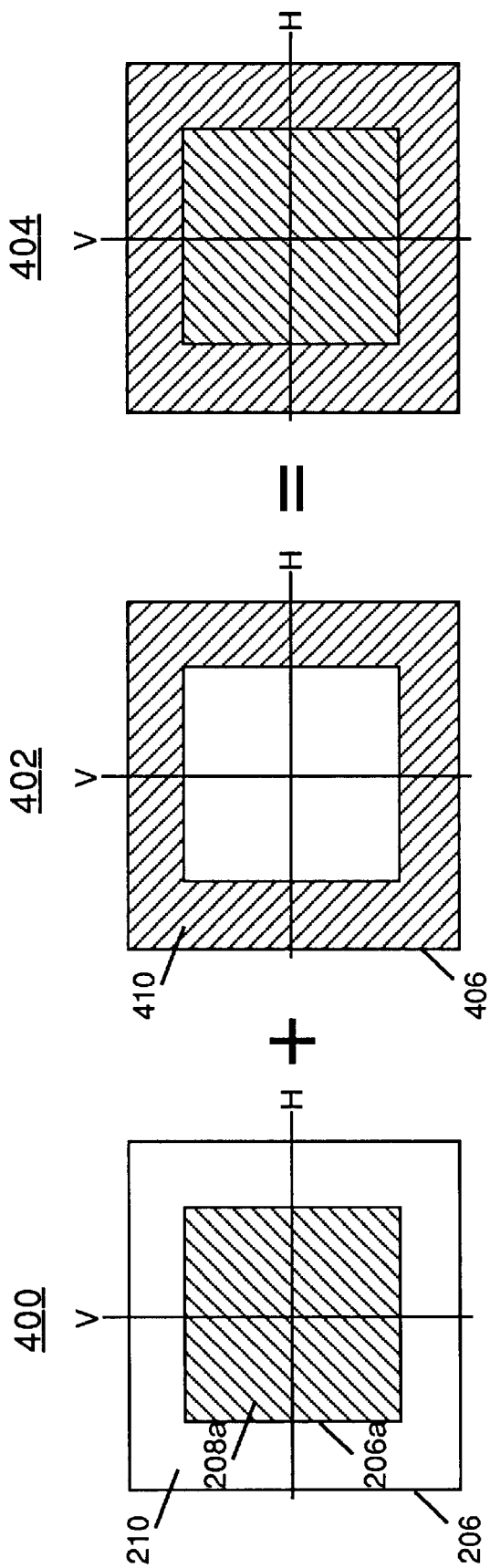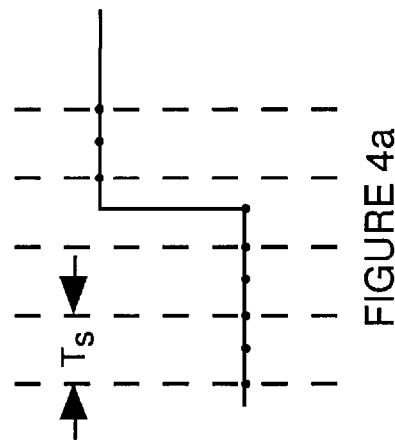
FIGURE 4
FIGURE 4a

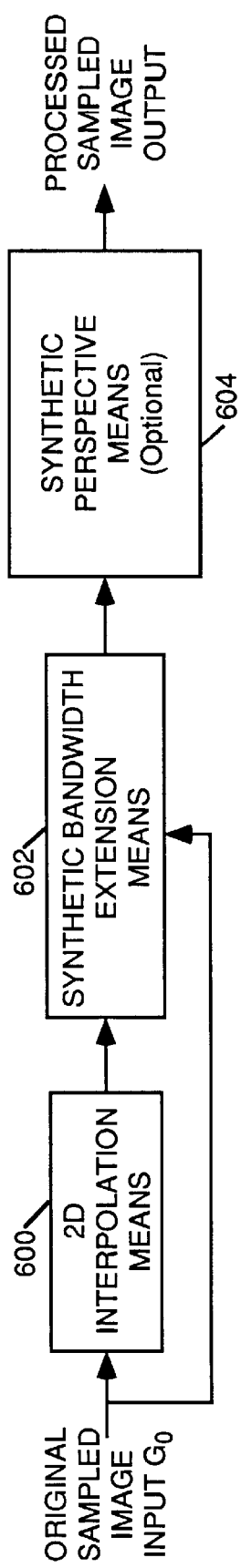
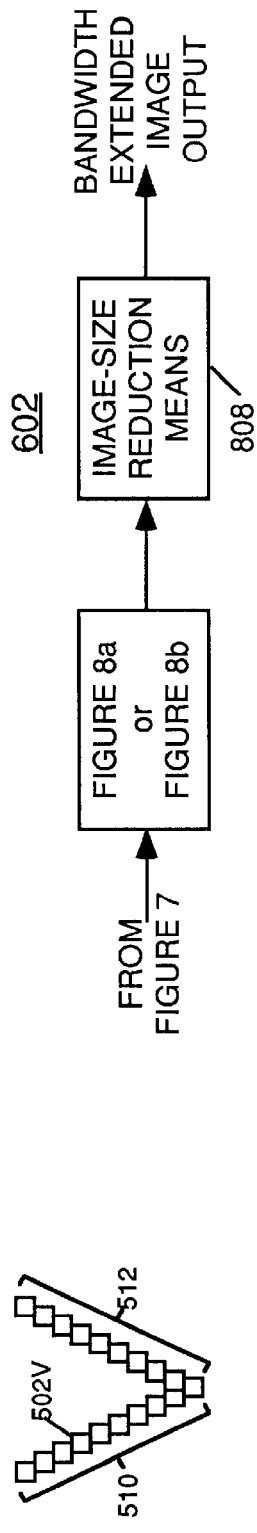

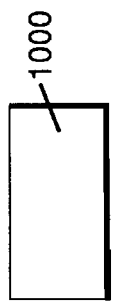
FIGURE 10
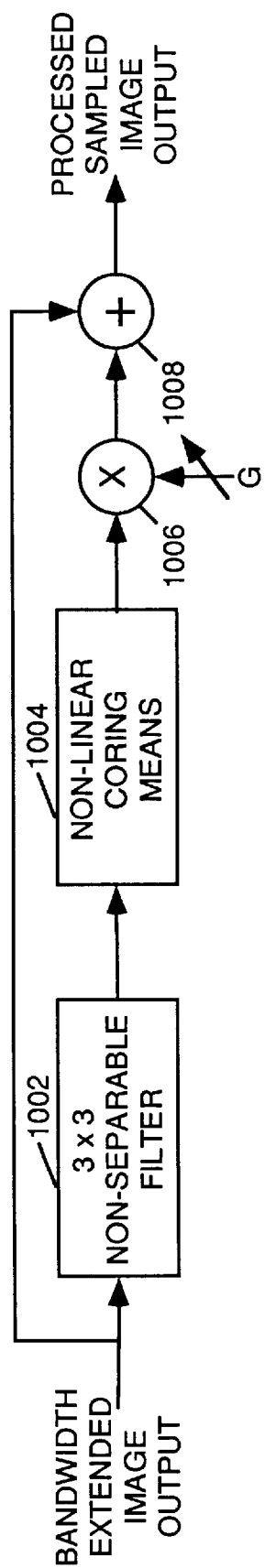
FIGURE 10a
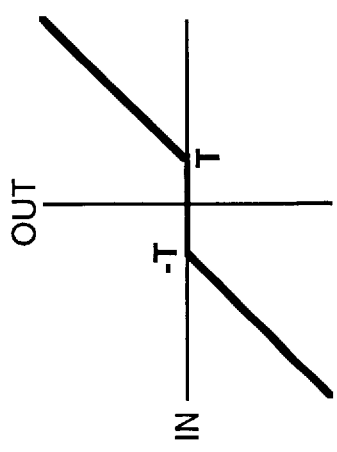
$$F = 1/18 \begin{bmatrix} -1 & -2 & -2 \\ -2 & 16 & -2 \\ -2 & -2 & -3 \end{bmatrix}$$
FIGURE 10b
FIGURE 10c

PROCESSING APPARATUS FOR SYNTHETICALLY EXTENDING THE BANDWIDTH OF A SPATIALLY-SAMPLED VIDEO IMAGE

BACKGROUND

1. Field of the Invention

This invention relates to processing techniques capable of enlarging the size of a spatially-sampled video image originally having predetermined horizontal and vertical resolutions and, more particularly, to processing techniques which preserve, in the enlarged video image, the sharpness of the edge information of the original video image.

2. Description of the Prior Art

Incorporated by reference herein is our earlier U.S. Pat. No. 5,355,328, issued Oct. 11, 1994, and entitled "Resampling Apparatus Suitable for Resizing a Video Image". This patent discloses both resampling apparatus for reducing the size of a spatially-sampled original video image in the horizontal and/or vertical directions and resampling apparatus for enlarging the size of a spatially-sampled original video image in the horizontal and/or vertical directions. The size-reduction case, which involves a decrease in the spatial sampling of the video information of the originally-sampled video image, does not adversely affect the appearance of a reduced-sized displayed image. However, the size-expansion case, which involves an increase in the spatial sampling of the video information of the originally-sampled video image, does adversely affect the appearance of an enlarged-sized displayed image. Specifically, by causing a smearing or blurring over an extended area in the appearance of the sharp edges that appear in an originally-sampled displayed image. The reason for this is that the data defined by each of the increased samples of the size-enlarged image is derived by interpolation of the image data samples in the originally-sampled image (since the originally-sampled image data is the only image data that is available).

More particularly, when it becomes necessary to enlarge an original spatially-sampled image or picture using digital processing techniques, where the original spatially-sampled image is already fixed in horizontal and vertical resolution by the original horizontal and vertical spatial-sampling periods, the enlarged image appears defocused or blurred because it does not contain the additional high-frequency image data necessary to support the new higher spatial-sampling structure. Traditional approaches to enlarging pictures include interpolating the image samples with a digital filter. The better the filter, that is, the closer to the ideal brick-wall filter response, the better the resultant image.

Unfortunately, even with the best interpolation filter, the image will never appear sharp for images that contain edge-like information. This is because enlargement spreads the image information over a wider spatial area, and the interpolation fills newly created sample positions in-between original samples as best as is possible. The resulting edge after interpolation is spread over a wider area, which causes the edge to lose fidelity and appear soft or blurred. The reason for this is that the enlarged image needs more information than is available to the interpolator. In fact, the enlarged image needs to have extra higher-frequency information added in order to reconstruct the edges similar to that before enlargement.

Added extra higher-frequency information (i.e., bandwidth extension) is also needed for the case in which it is desired to display a digital video image on a monitor having horizontal and vertical resolutions that are higher than the original horizontal and vertical resolutions of the digital video image to be displayed.

Traditional approaches to bandwidth extension include inverse filtering, where it is assumed that some lowpass filtering process was responsible for the blur, and that by applying the inverse of the filter, this blur can be removed. These techniques are difficult to implement, and are highly sensitive to noise. Other approaches include analyzing the image information in the frequency domain, and after determining the relative cosine and sine contributions extend the frequencies to higher order and add them into the image. This unfortunately is computationally very expensive and does not reliability give good subjective results. In fact, all such approaches fall short of the subjective improvement required.

Another approach serves to enhance enlarged images by boosting what energy already exists in the image signal to greater levels, thereby giving an overall subjectively looking sharper image appearance. This approach is accomplished by peaking, whereby the higher-frequencies in the image are boosted in amplitude relative to the lower frequencies. However, this does not create the additional bandwidth or frequencies needed to produce the edge profile defined in the original image. Therefore, a peaking approach shows improvement only for very small enlargement factors (which is usually well below an enlargement of two), and the performance of this peaking approach is further hampered by the quantity of noise existing in the image.

The synthetic bandwidth extension approach envisioned by the present invention is effective in substantially preventing the occurrence of any adverse affect in the appearance of an enlarged-sized displayed image of a sampled original image, in which the enlarged-sized displayed image has had its sampling frequency increased prior to display.

SUMMARY OF THE INVENTION

The present invention is directed to image processing apparatus for extending the frequency bandwidth of an original video image that is spatially-sampled at a first sampling frequency and is represented by an input data stream comprising successive pixel values that define the frequency bandwidth. The apparatus comprises first and second means. The first means derives, from the pixel values of the input data stream, (1) a first data stream that comprises successive pixel values of a first image component that has substantially the same frequency bandwidth as the original video image and is spatially sampled at a second sampling frequency which is sufficiently higher than the highest frequency component of the frequency bandwidth of the original video image to result in the first image component being significantly oversampled, and (2) a second data stream that comprises synthetically-derived successive correction-waveform pixel values of a second image component that is spatially-sampled at the second sampling frequency. The synthetically-derived successive correction-waveform pixel values defines spatial frequencies of the second image component that are higher in frequency than the highest frequency component of the original video image. The second means sums the corresponding pixel values of the first and second data streams to thereby derive a third data stream of successive pixel values that define the frequency-extended bandwidth of an output video image from the second means with respect to the frequency bandwidth of the original video image.

BRIEF DESCRIPTION OF THE DRAWING

FIG. 4 diagrammatically shows, in the frequency domain, the effect of summing the interpolated signal of FIG. 2a and a synthetically-derived bandwidth extrapolation signal that is sampled at twice the given periodic sampling rate;

FIG. 4a shows, in the time domain, the result of the summing shown in FIG. 4;

FIG. 5 illustrates the difference in the appearance of a digital image of the letter "H" and a digital image of the letter "V";

FIG. 6 is a block diagram showing the combination of a 2D interpolation means, a synthetic bandwidth extension means and an optional synthetic perspective means, which together comprise the major structural components of the present invention;

FIG. 7a illustrates a preferred embodiment of the band-split filter of the a 2D interpolation means shown in FIG. 7;

FIGS. 8a, 8b and 8c are block diagrams showing, respectively, first, second and third preferred embodiments of the synthetic bandwidth extension means of FIG. 6;

FIG. 9a shows a preferred implementation of both the common bandwidth synthesis stage and a representative one of a set of N ordinally-arranged bandwidth synthesis stages of FIG. 8a;

FIG. 10, shows the appearance of a drop shadow effect on a rectangular object in the display of an output image from synthetic perspective means 604;

FIG. 10a is a block diagram of a preferred embodiment of synthetic perspective means 604;

FIG. 10b shows the slightly-skewed highpass filter function of the 3×3 non-separable filter of FIG. 10a; and FIG. 10c shows the output-input relationship of the non-linear coring means of FIG. 10a.

DESCRIPTION OF THE PREFERRED EMBODIMENTS

Figure 1:
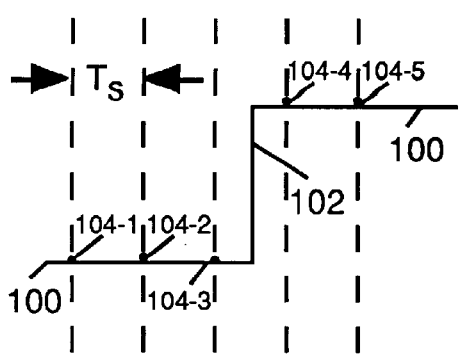
FIGS. 1 and 1a, respectively, show in the time domain and in the frequency domain, the spatial signal of a brick-wall edge of a raster-scanned two-dimensional (2D) original image that has been periodically sampled at a given rate.

FIG. 1 shows the relative amplitude of spatial signal 100 of a scanned 2D original image as a function of time. Spatial signal 100, which is sampled with a sampling period of $T_s$, comprises a brick-wall edge 102 which occurs in between pixel samples 104-3 and 104-4 of the series of successive pixel samples 104-1 to 104-5 shown on FIG. 1.

Figure 1A:
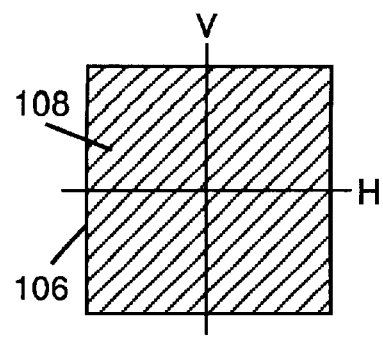

Square area 106 of FIG. 1a shows the available 2D (i.e., horizontal (H) and vertical (V)) frequency bandwidth defined by the sampling period $T_s$ of pixel samples 104-1 to 104-5, and cross-hatching 108 indicates the portion of the available 2D frequency bandwidth of area 106 actually employed by brick-wall edge 102. As indicated by in FIG. 1a, the frequency bandwidth, indicated by cross-hatched portion 108, occupies 100 percent of the available frequency bandwidth, indicated by area 106.

Figure 2:
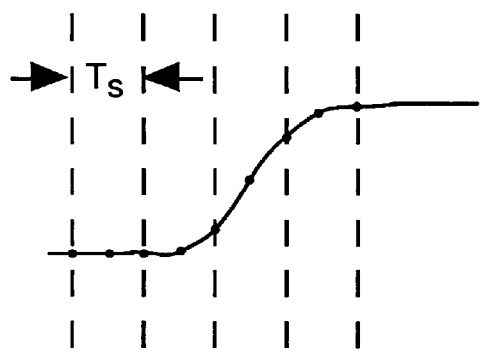
FIGS. 2 and 2a, respectively, show in the time domain and in the frequency domain, the spatial signal of FIGS. 1 and 1a after interpolation at twice the given periodic sampling rate has taken place.

FIG. 2 indicates the effect of performing a known digital interpolation process on the series of successive pixel samples 104-1 to 104-5 shown on FIG. 1, which provides a sampling period of only $T_s/2$. Thereby, the number of pixel samples is upsampled by a factor of two. More specifically, known interpolation process involves first inserting a zero-valued pixel sample midway between each pair of successive ones of pixel samples 104-1 to 104-5 and then passing the resulting doubly-sampled signal through a digital low-pass filter. As indicated in FIG. 2, this interpolation process causes the energy formerly in brick-wall edge 102 to be spread over a plurality of $T_s/2$ sampling periods, thereby destroying the brick-wall. In other words, the interpolation process results in the scanned 2D original image becoming oversampled.

Figure 2A:
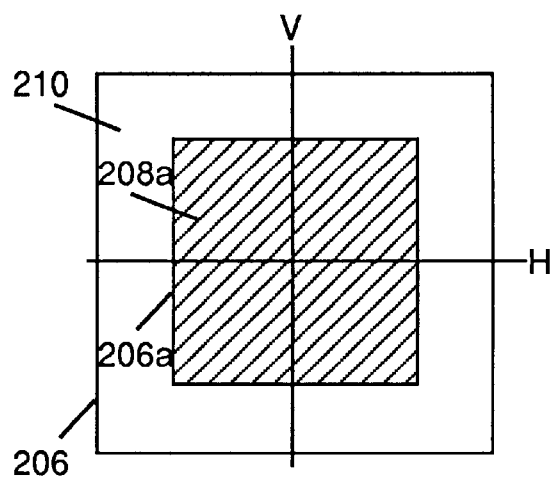

The reason that this oversampling causes spreading is made apparent in FIG. 2a. Upsampling the number of pixel samples by a factor of two results in each of the H and V available frequency bandwidth being doubled, as indicated by square area 206 of FIG. 2a. However, the interpolation process does not add any frequency bandwidth information to that already provided by brick-wall edge 102. Therefore, the square-area portion 206a of the available 2D frequency bandwidth of square area 206 actually employed by the plurality of $T_s/2$ sampling periods, indicated by cross-hatched portion 208a of area 206, remains the same size as cross-hatched portion 108 of square area 106. Thus, the added portion 210 of the available frequency bandwidth resulting from the oversampling, indicated by square area 206, remains unoccupied.

Figure 3:
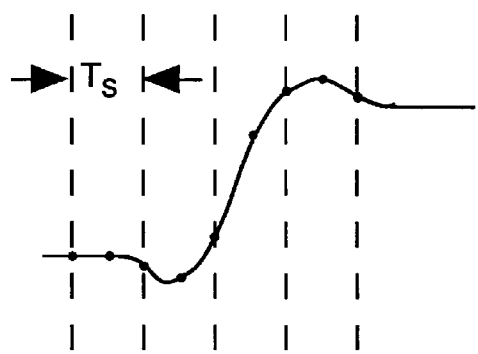
FIGS. 3 and 3a, respectively, show in the time domain and in the frequency domain, the interpolated signal of FIGS. 2 and 2a after an upper frequency component thereof has been peaked by being passed through a high-frequency filter.
Figure 3A:
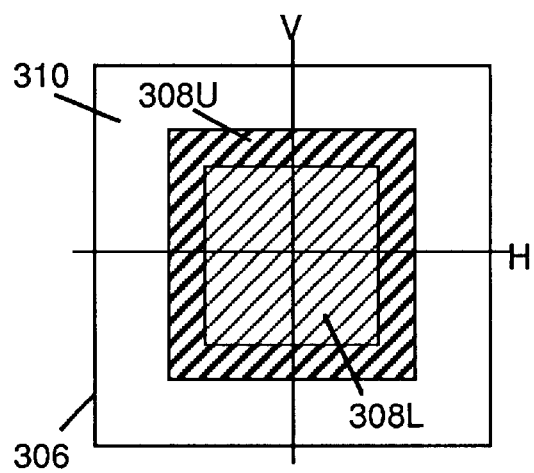

Further, this spreading causes sharp edges in an enlarged displayed image to be blurred by being smeared over a larger spatial area. To reduce somewhat the subjective effect of such blurring on a viewer of the enlarged displayed image enlarged displayed image, the interpolation process may further include high-frequency peaking. Specifically, passing the interpolated pixel samples shown in FIG. 2a through a high-pass peaking filter results in the waveform defined by the peaked pixel samples being that shown in FIG. 3. However, as indicated in FIG. 3a, all that peaking does is to divide the cross-hatched portion into darker cross-hatched upper-frequency component 308U and lighter cross-hatched lower-frequency component 308L, with the amplitudes within component 308U being increased relative to the amplitudes within component 308L. However, the total area of cross-hatched components 308U and 308L is the same as the area of cross-hatched portions 108 and 208, and the unoccupied added portion 310 of the available frequency bandwidth, indicated by area 306, is the same as the unoccupied added portion 210. Thus, peaking does nothing to correct for the spreading of brick-wall edges (and the resulting blurring of sharp edges in an enlarged displayed image) caused by the above-described interpolation process.

FIG. 4 illustrates the approach taken by the present invention to correct for the spreading of brick-wall edges caused by the above-described interpolation process shown in FIGS. 2 and 2a. In FIG. 4, block 400 (which corresponds to the block shown in FIG. 2a) represents the output of the interpolation process; block 402 represents the extended high-frequency bandwidth of a correction waveform, defined by synthetically-derived pixel samples, that occupies solely cross-hatched portion 410 of area 406, with occupied cross-hatched portion 410 of area 406 corresponding in size with unoccupied portion 210 of area 206 of block 400; and block 404 represents the sum of blocks 400 and 402. The respective amplitude values of the synthetically-derived $T_s/2$ period pixel samples of the extended high-frequency bandwidth correction waveform, when algebraically added to the corresponding respective amplitude values of the $T_s/2$ period interpolated pixel samples, results in the corresponding respective amplitudes of the $T_s/2$ period sum-value pixel samples defining a brick-wall edge, as shown in FIG. 4*a*.

For tutorial purposes, reference is made to FIG. 5, which illustrates the difference in the appearance of a digital image 500H of the letter "H" and a digital image 500V of a digital image 500V. Each of these letters is made up of a mosaic arrangement of individual pixels, such as pixels 502H of letter "H" and pixels 502V of letter "V". Each pixel making up each of these letters exhibits a digital characteristic (e.g., intensity-level and/or color) that distinguishes the shape of that letter from the digital characteristics of the pixels of the digital image (not shown) that surround that letter. Each individual pixel 502H and 502V is assumed to occupy an area having certain given vertical and horizontal spatial dimensions, as shown in FIG. 5.

It will be noted that digital image 500H comprises vertical mosaic arrangements 504 and 506 and a horizontal mosaic arrangement 508 of pixels 502H. Vertical and horizontal mosaic arrangements, such as employed in digital image 500H, do not result in producing jagged (i.e., staircase) edges of the digital image of the letter "H". However, digital image 500V comprises diagonal mosaic arrangements 510 and 512 which do result in producing jagged edges of the digital image of the letter "V".

In the display of an original digital image, the vertical and horizontal spatial dimensions of each pixel are usually so small that jagged diagonal edges are either unresolvable by the viewer or, at least, only slightly objectionable to the viewer. However, when the original digital image, or a selected portion thereof, is enlarged by a relatively large factor, the now easily resolvable jagged diagonal edges in the enlarged digital image are highly objectionable to the viewer.

As is known, 2D enlargement of an original digital image involves 2D upsampling followed by 2D interpolation filtering (which for large enlargement may be employed successively several times). A relatively cost-effective known way to accomplish 2D upsampling followed by 2D interpolation filtering is to serially provide, in either order, a 1D vertical upsampling and interpolation and a 1D horizontal upsampling and interpolation, on an ongoing data stream of successive digital pixels. In this regard, our aforesaid earlier U.S. Pat. No. 5,355,328 teaches enlarging the vertical and/or horizontal dimensions of an original digital image, each by an enlargement factor M/N, where M is any first selected integer which is larger than a second selected integer. Thus, if N=1 or is evenly divisible into M, M/N will be a whole number having a value greater than 1. Otherwise, the original digital image will be enlarged by an improper-fractional amount. Usually the value of the enlargement factor M/N is the same for both the vertical and horizontal dimensions so as to not change the shape, in the enlarged digital image, of the features depicted in the original digital image.

1D upsampling in the vertical or horizontal dimension involves inserting a zero-valued pixel between each pair of already-present adjacent pixels in that dimension. 1D interpolation in the vertical or horizontal dimension involves substituting a value for each zero-valued pixel that is computed as a given interpolation function of the respective values of two or more already-present pixels in that dimension. The simplest and least costly given interpolation function is to substitute, for each zero-valued pixel, the arithmetic mean value of the respective values of the already-present pixels in that dimension adjacent that zero-valued pixel.

Each brick-wall edge (such as shown in FIG. 1), of an original digital image, which is oriented either in a vertical or horizontal direction will result in a blurred edge (such as shown in FIG. 2) in a 2D enlarged digital image derived by means of separate 1D vertical and 1D horizontal interpolations. However, separate 1D interpolations that are respectively oriented in the vertical and horizontal directions are not very effective in smoothing or blurring diagonally-oriented brick-wall edges in the enlarged digital image. Therefore, sharp, jagged diagonal edges (such as shown by the letter V in FIG. 5) will be highly visible and objectionable in the enlarged digital image.

An object of the present invention is to provide a digital technique for converting scanned 2D digital data samples defining an original 2D digital image comprising a given pixel density into an enlarged 2D digital image having a higher pixel density in a manner such that the subjective appearance of edges in the original 2D digital image are retained or even enhanced in the enlarged 2D digital image.

Figure 7:
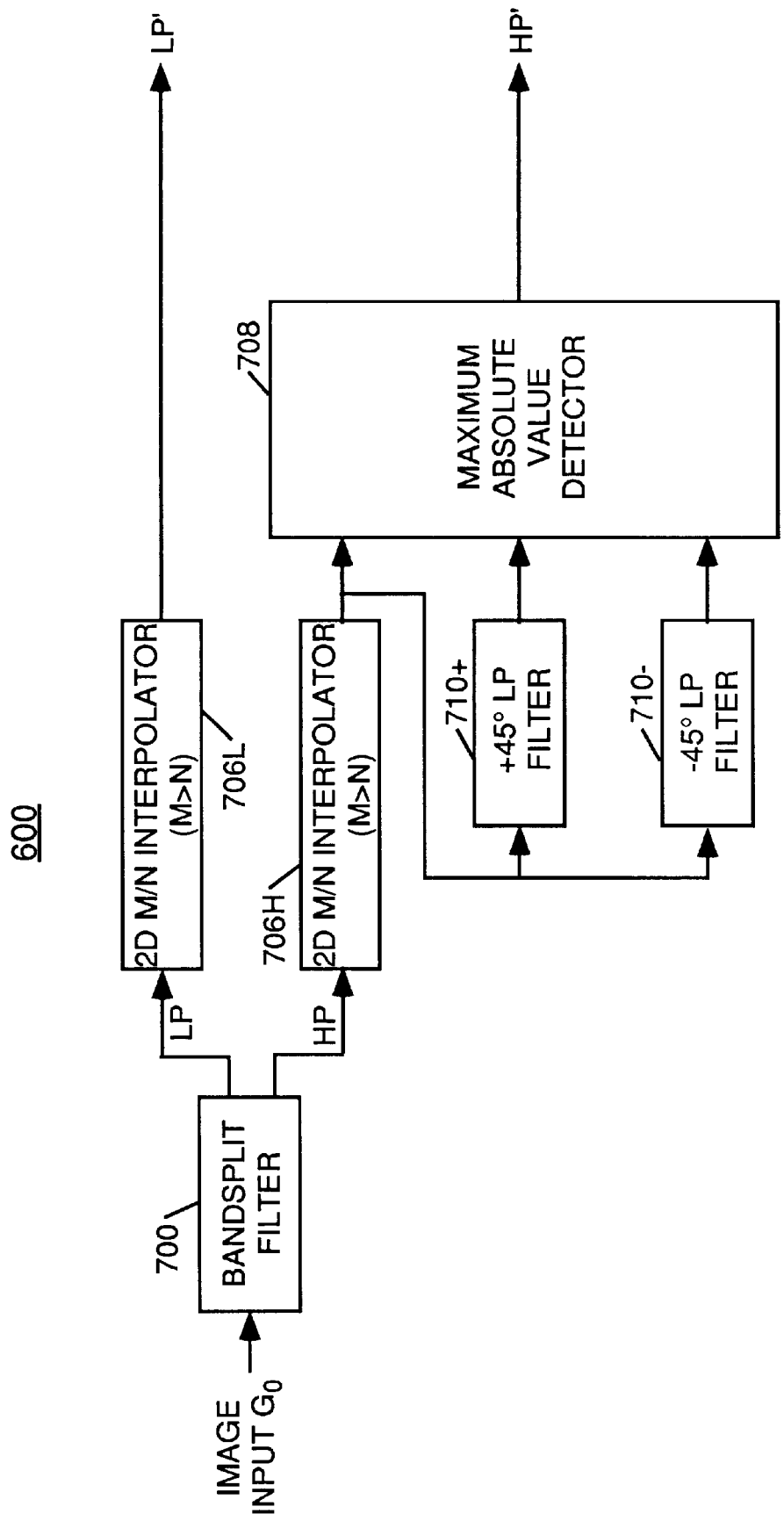
FIG. 7 is a block diagram of a preferred embodiment of the 2D interpolation means of FIG. 6.
Figure 8A:
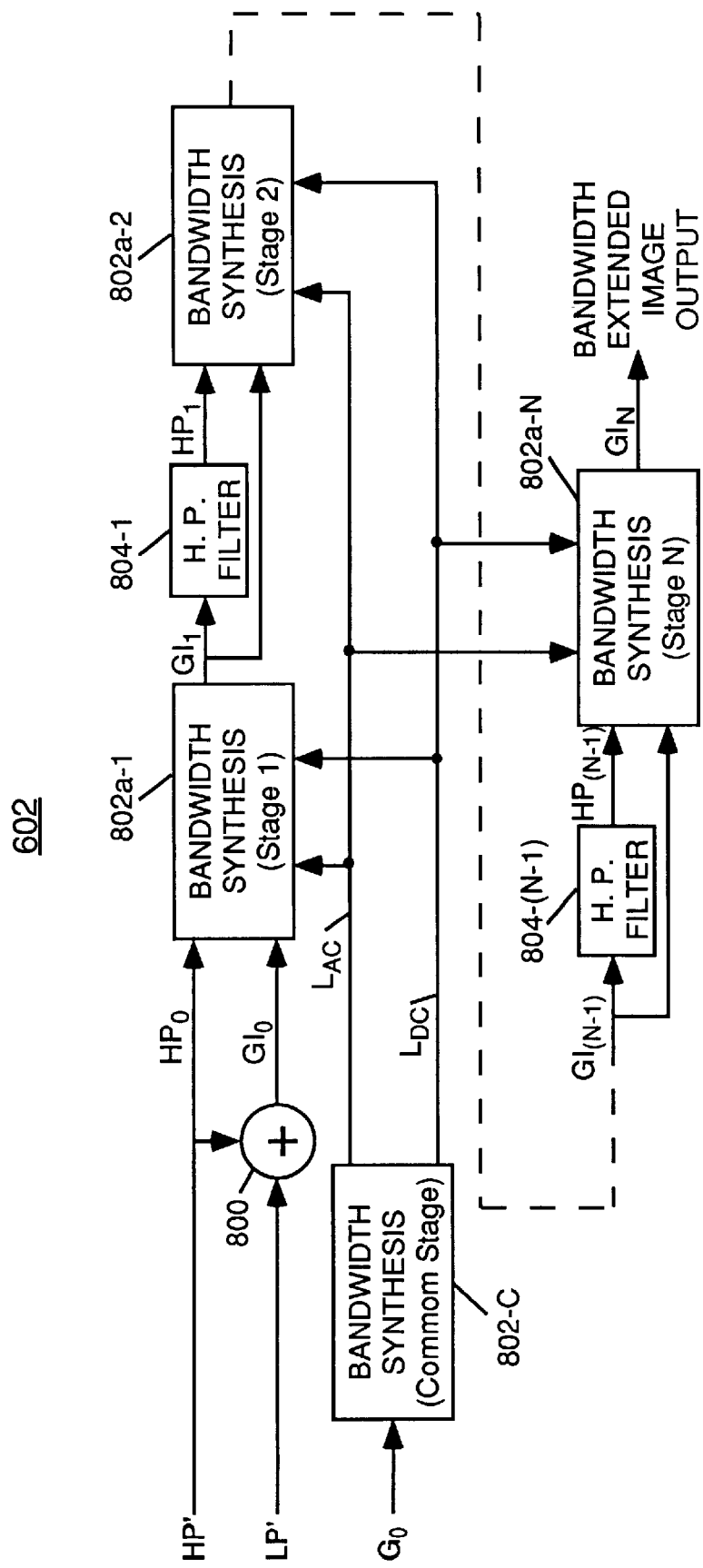
Figure 8B:
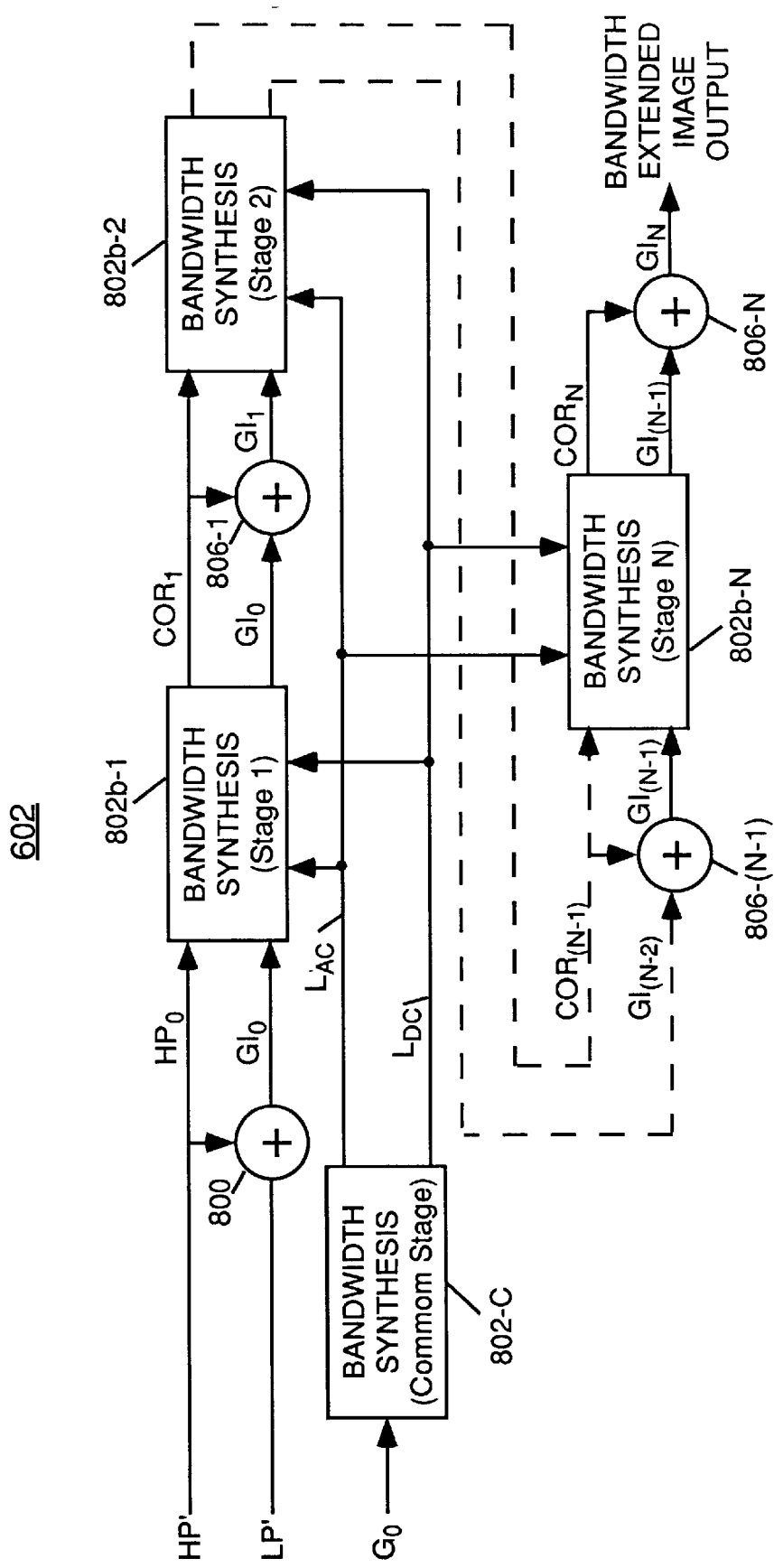

Referring now to FIG. 6, there is shown 2D interpolation means 600 (a preferred embodiment of which is shown in FIG. 7), synthetic bandwidth extension means 602 (preferred embodiments of which are shown in FIGS. 8*a* and 8*b*), and optional synthetic perspective means 604 (a preferred embodiment of which is shown in FIG. 10*a*). Successive digital samples of an ongoing progressive-scan data stream $G_0$, representing a scanned original image, are applied as an input to 2D interpolation means 600 and as a first input to synthetic bandwidth extension means 602. As is often the case, the progressive-scan data stream $G_0$ may have been derived from an interlaced-scan analog (e.g., NTSC) video signal. If this is the case, the interlaced-scan analog video signal has already been digitized, by passing it through an analog-to digital converter (not shown), and then the interlaced-scan digital video signal has already been converted to progressive-scan data stream $G_0$ by appropriately writing the interlaced-scan digital video signal into a frame memory (not shown), while appropriately reading the progressive-scan data stream $G_0$ out from the frame memory, as is known in the art.

The output from 2D interpolation means 600 is applied as a second input to synthetic bandwidth extension means 602. If optional synthetic perspective means 604 is used, the output from synthetic bandwidth extension means 602 is applied as an input thereto. In this case, the successive processed digital samples of the ongoing data stream at the output from synthetic perspective and noise reduction means 604 represents the scanned enlarged image. In the case in which optional synthetic perspective and noise reduction means 604 is not used, the successive processed digital samples of the ongoing data stream at the output from synthetic bandwidth extension means 602 represents the scanned enlarged image.

In the preferred embodiment of 2D interpolation means 600 shown in FIG. 7, data stream $G_0$, defining the original 2D image, is applied as an input to bandsplit filter 700, which divides the overall 2D spatial frequency band of $G_0$ into a low-pass (LP) band and a high-pass (HP) band. Preferably, bandsplit filter 700 takes the form shown in FIG. 7a. As indicated in FIG. 7a, $G_0$ is applied both as an input to 3×3 LP filter 702 (which comprises separable 3-tap 1D vertical (V) and 3-tap 1D horizontal (H) LP filters, each employing ¼, ½, ¼ kernel function values) and to the plus (+) input of algebraic summer 704. The output of filter 702 is applied both as the LP output of bandsplit filter 700 and to the minus (−) input of summer 704. The output from summer 704, which constitute successive pixel values each of which is equal to the difference between corresponding pixel values then applied to the plus and minus inputs of summer 704, is applied both as the HP output of bandsplit filter 700. However, it should be understood that bandsplit filter 700 may take other forms, known in the art, that are more complex than that shown in FIG. 7a.

As known in the art, a 3-tap V filter involves the need to store at least two scanlines of pixels derived from the ongoing data stream and a 3-tap H filter involves the need to store at least two pixels derived from the ongoing data stream. Bandsplit filter 700 may include shift-register delay lines to provide the needed storage. Alternatively, should a frame memory (not shown) have been employed for interlace/progressive scan conversion, it also may be used to provide at least two scanlines of required storage.

Returning to FIG. 7, the LP and HP outputs from bandsplit filter 700 are applied, respectively, as inputs to 2D interpolators 706L and 706H, which for illustrative purposes are assumed to be interpolators of the type disclosed in our earlier U.S. Pat. No. 5,355,328 that is capable of enlarging an image by a factor which may be either a whole number or an improper fraction M/N, where M>N. The successive pixels of the increased 2D spatial sampling frequency data stream output from interpolator 706L constitutes the LP' output from interpolation means 600. However, the successive pixels of the increased 2D spatial sampling frequency data stream output from interpolator 706H are applied, respectively, as a first input to maximum absolute value detector 708, as an input to +45° LP filter 710+ and as an input to −45° LP filter 710−. The output from +45° LP filter 710+ is applied as a second input to maximum absolute value detector 708 and the output from −45° LP filter 710− is applied as a third input to maximum absolute value detector 708. Detector 708 performs the function of comparing the relative absolute values of each successive group of three pixels concurrently applied as the first, second and third inputs to detector 708 and forwarding as an output from to detector 708 that one of the three pixels from each successive group that has been found to have the maximum absolute value. The successive pixels of the increased 2D spatial sampling frequency data stream output from detector 708 constitutes the HP' output from interpolation means 600.

Each of +45° LP filter 710+ and −45° LP filter 710− is preferably a 3-tap filter. However, alternatively, each of +45° LP filter 710+ and −45° LP filter 710− could be a more complex LP filter having more than three taps. As known, the value of each pixel at the output a 3-tap +45° LP filter is the sum of (1) ¼ the value of its concurrent pixel of the data stream input to the filter, (2) ½ the value of that pixel of the data stream input that has undergone a delay of one scanline plus one pixel, and (3) ¼ the value of that pixel of the data stream input that has undergone a delay of two scanlines plus two pixels. The value of each pixel at the output a 3-tap −45° LP filter is the sum of (1) ¼ the value of its concurrent pixel of the data stream input to the filter, (2) ½ the value of that pixel of the data stream input that has undergone a delay of one scanline minus one pixel, and (3) ¼ the value of that pixel of the data stream input that has undergone a delay of two scanlines minus two pixels.

The interpolation process by interpolator 706H inherently results in significant blurring of vertical and horizontal edges (but only slight blurring of diagonal edges) of the enlarged image defined by the data stream output from interpolator 706H applied as a first input to detector 708. However, diagonal edges of the enlarged image defined by the data stream outputs from +45° LP filter 710+ and −45° LP filter 710− applied, respectively, as a second and third inputs to detector 708 are blurred. This insures that all edges of the enlarged image defined by the data stream output HP' from detector 708 (regardless of the angular orientation of an edge in the enlarged image) will be significantly blurred. Therefore, any jagged diagonal edge (of the type discussed above in connection with FIG. 5) occurring in the enlarged image defined by the data stream output from interpolator 706H will be eliminated in the significantly blurred corresponding diagonal edge of the enlarged image defined by the data stream output HP'. The capability of eliminating jagged diagonal edges in the enlarged image is one benefit of the present invention. However, it is still necessary to remove the blur of all edges of the enlarged image defined by the data stream output HP' in order to achieve edges in the enlarged image that are sharp, as desired. Sharpening of the blurred edges is accomplished by synthetic bandwidth extension means 602, to which the LP' and HP' outputs from 2D interpolation means 600 are applied as inputs to means 602.

FIG. 8a (which is directed to a first preferred embodiment of synthetic bandwidth extension means 602) shows summer 800, a common stage for bandwidth synthesis 802-C, an ordinally-arranged set of stages for bandwidth synthesis 802a-1, 802a-2 . . . 802a-N, and an ordinally-arranged set of HP filters 804-1 . . . 804-(N−1). The original-image data stream $G_0$ is applied as an input to common bandwidth synthesis stage 802-C. Stage 802-C comprises structure including interpolators for deriving as outputs therefrom local AC interpolated-sample data stream $L_{AC}$ and local DC interpolated-sample data stream $L_{DC}$. Each of data streams $L_{AC}$ and $L_{DC}$ is applied as an input to each of bandwidth synthesis stages 802a-1, 802a-2 . . . 802a-N. Further, the HP' and LP' inputs to synthetic bandwidth extension means 602 from 2D interpolation means 600 are combined by summer 800 to provide full-bandwidth, interpolated-sample data stream $GI_0$ at the output from summer 800. Also the HP' interpolated-sample data stream is applied as a first input $HP_0$ to bandwidth synthesis stage 802a-1, while interpolated-sample data stream $GI_0$ is applied as a second input to bandwidth synthesis stage 802a-1. The output from each of the ordinally-arranged set of bandwidth synthesis stages 802a-1 . . . 802a-(N-1) is applied both directly and through a corresponding ordinal one of the set of HP filters 804-1 . . . 804-(N−1) as inputs to its immediately following ordinal one of the bandwidth synthesis stages 802a-2 . . . 802a-N in the set. The data stream output from bandwidth synthesis stage 802a-N constitutes the bandwidth-extended image output from synthetic bandwidth extension means 602.

Figure 9A:
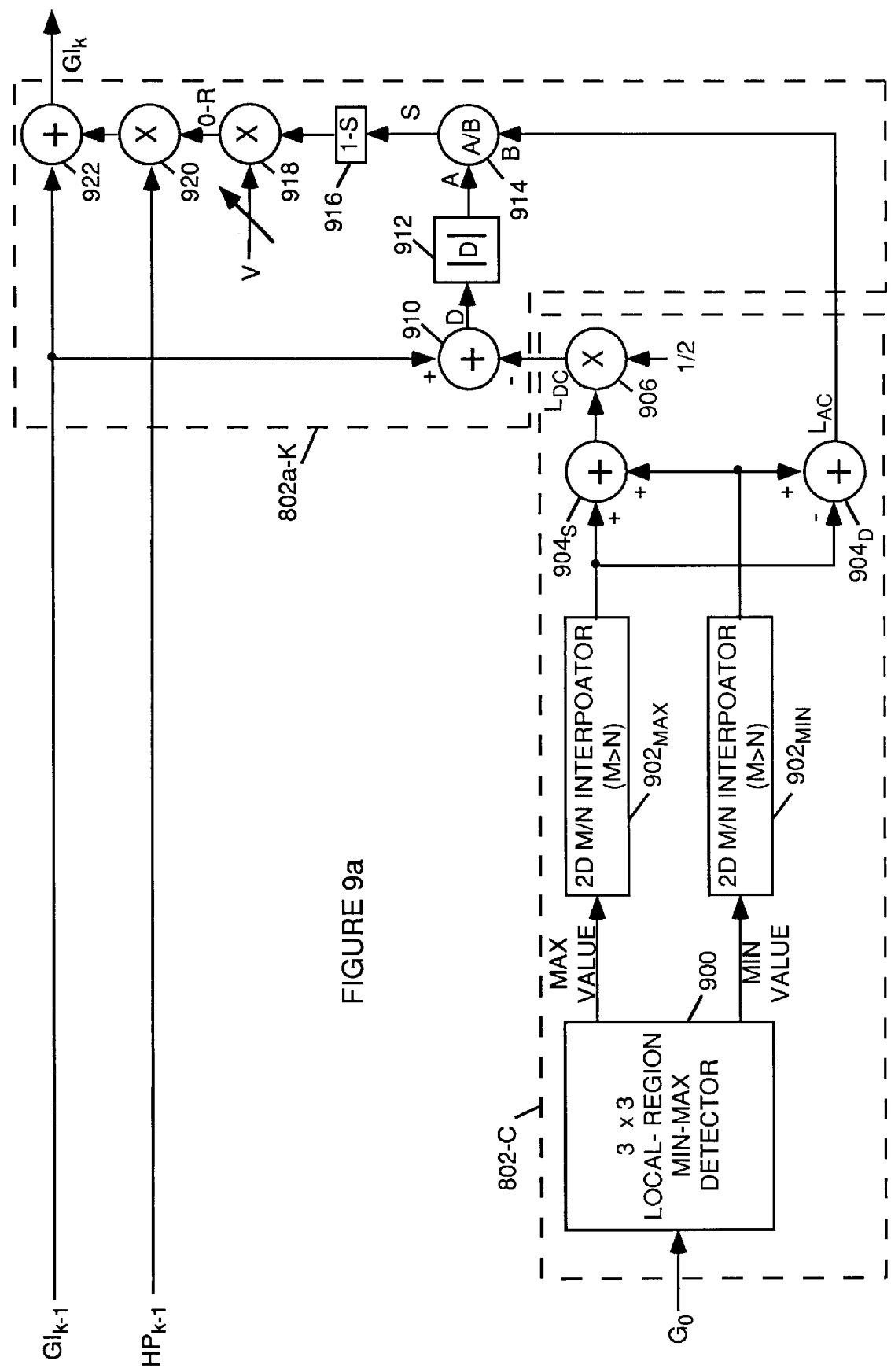

FIG. 9a shows preferred embodiments of the structures of both common bandwidth synthesis stage 802-C and bandwidth synthesis stage 802a-K, where $N \geq K \geq 1$. As indicated in FIG. 9a, bandwidth synthesis stage 802-C comprises 3×3 local-region minimum-maximum detector 900, 2D interpolators 902$_{MAX}$ and 902$_{MIN}$, algebraic summers 904$_S$ and 904$_D$, and multiplier 906.

Figure 9B:
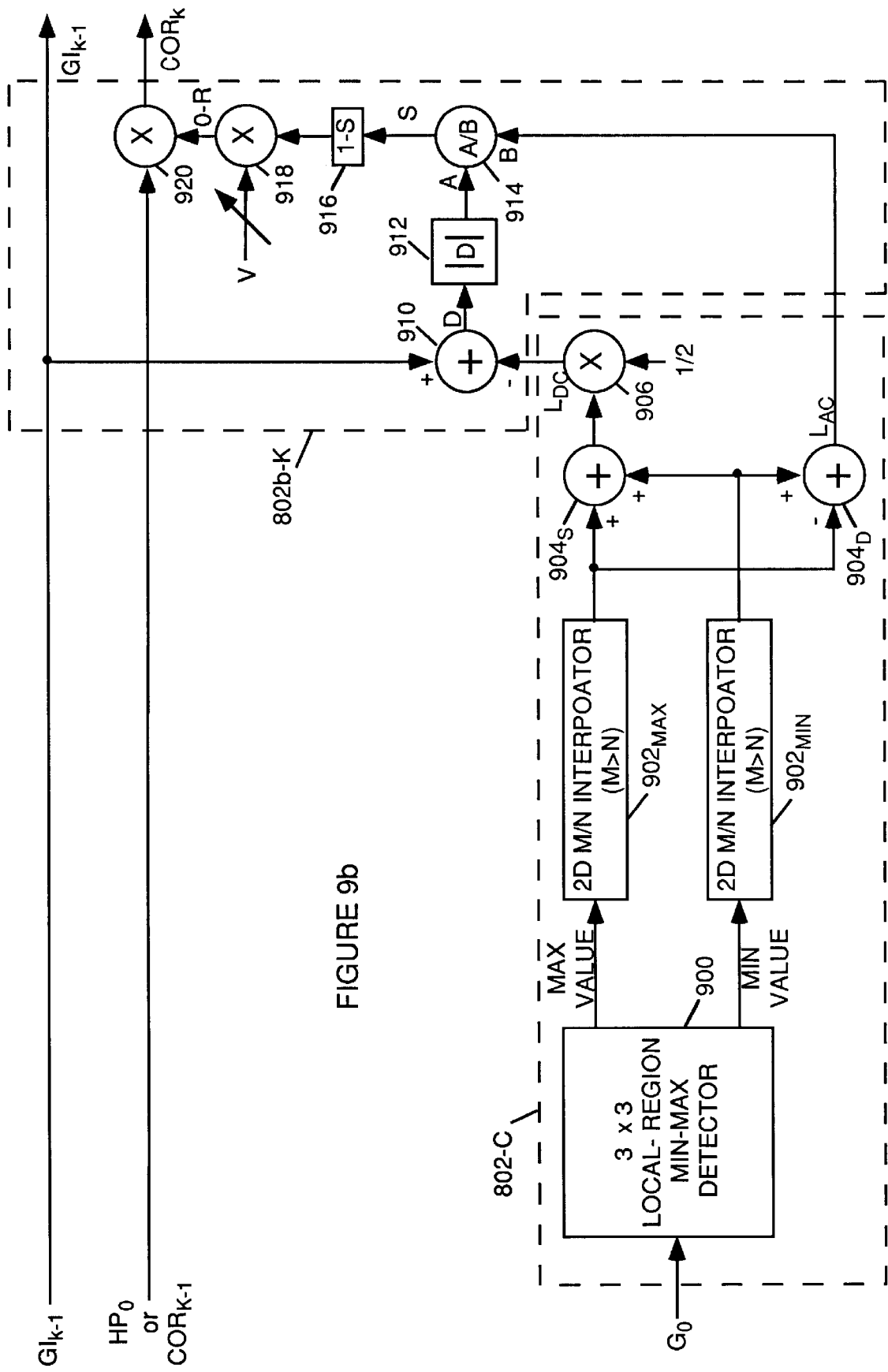
FIG. 9b shows a preferred implementation of both the common bandwidth synthesis stage and a representative one of a set of N ordinally-arranged bandwidth synthesis stages of FIG. 8b.
Figure 9C:
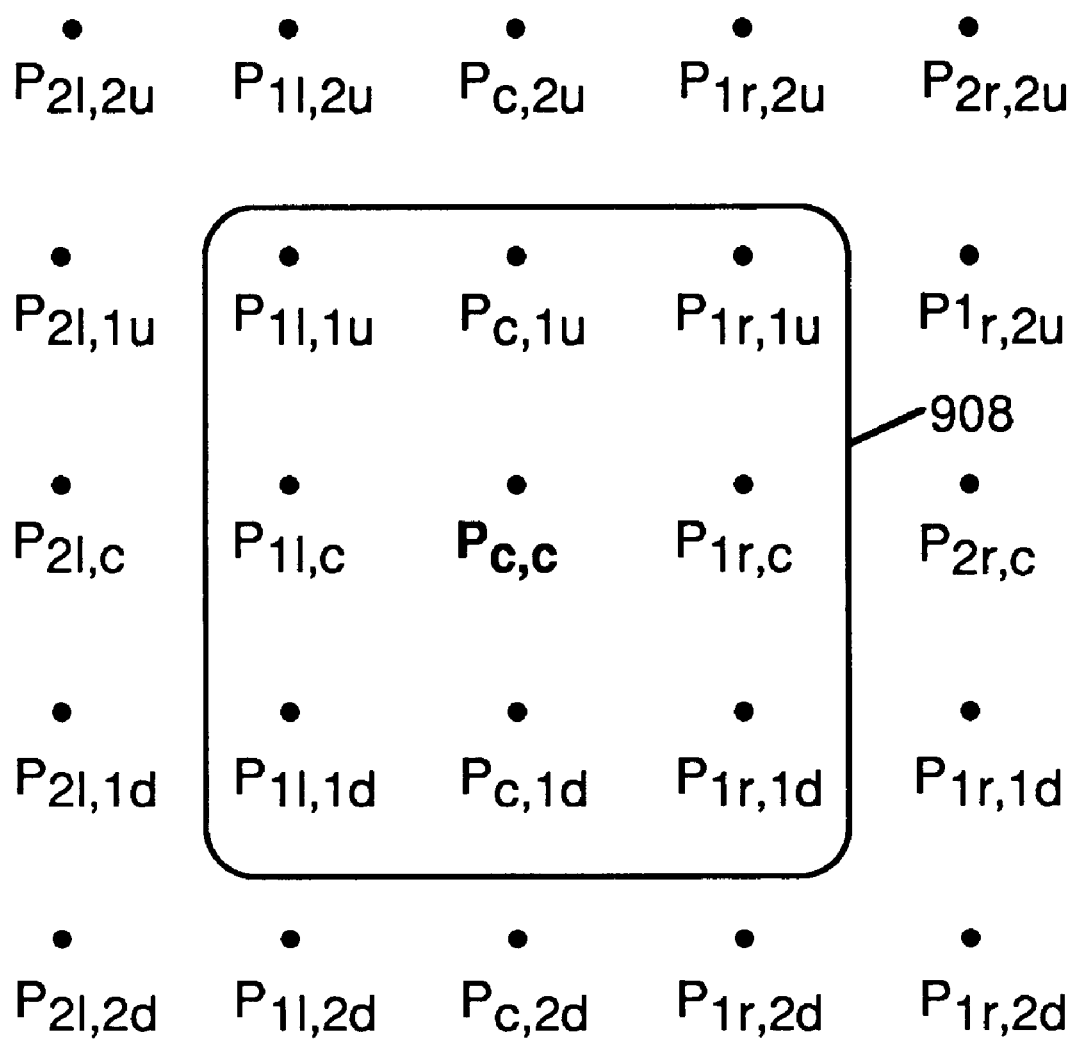
FIG. 9c is directed to the function performed by the 3×3 local-region minimum-maximum detector of each of FIGS. 9a and 9b.

FIG. 9c is directed to the function performed by 3×3 local-region minimum-maximum detector 900. FIG. 9c shows the coordinates of data-stream image pixels (P) located to the left (1) and right (r), and up(u) and down (d) relative to the coordinates of data-stream central image pixel $P_{c,c}$ (shown in bold type). As indicated, only the nine image pixels $P_{1l,1u}$, $P_{c,1u}$, $P_{1r,1u}$, $P_{1l,c}$, $P_{c,c}$, $P_{1r,c}$, $P_{1l,1d}$, $P_{c,1d}$ and $P_{1r,1d}$ are included within the 3×3 local-region window 908 centered on pixel $P_{c,c}$. Detector 900 performs the computing function of sorting these nine image pixels, in either ascending or descending order, in accordance with their respective digital values. In either case, that one of the sorted nine image pixels with the maximum digital value is forwarded to the max value output from detector 900 that is applied as an input to interpolator $902_{MAX}$, as shown in FIG. 9a. Similarly, that one of the sorted nine image pixels with the minimum digital value is forwarded to the min value output from detector 900 that is applied as an input to interpolator $902_{MIN}$, as also shown in FIG. 9a.

Thus, as indicated in FIG. 9a, (1) an interpolated-sample data stream of max value pixels is applied from the output of interpolator $902_{MAX}$ to a first plus (+) input of algebraic summer $904_S$ and a minus (−) input of algebraic summer $904_D$, and (2) an interpolated-sample data stream of min value pixels is applied from the output of interpolator $902_{MIN}$ to both a second plus (+) input of algebraic summer $904_S$ and a plus (+) input of algebraic summer $904_D$. The value of each pixel in the data stream output from summer $904_S$ is multiplied by a factor ½ by multiplier 906 to produce a value for that pixel at the output from multiplier 906 equal to the average value of the corresponding pixels from the output of interpolator $902_{MAX}$ and from the output of interpolator $902_{MIN}$. The output from multiplier 906 constitutes the $L_{DC}$ output from bandwidth synthesis stage 802-C and the output from summer $904_D$, which produces a value for each pixel at its output equal to the difference value of the corresponding pixels from the output of interpolator $902_{MAX}$ and from the output of interpolator $902_{MIN}$, constitutes the $L_{AC}$ output from bandwidth synthesis stage 802-C.

As shown in FIG. 9a, bandwidth synthesis stage 802a-K comprises algebraic summer 910, absolute-value derivation element 912, A/B divider 914, 1−S computation means 916, multipliers 918 and 920, and summer 922. The $GI_{k-1}$ data-stream input to bandwidth synthesis stage 802a-K is applied to the plus (+) input of algebraic summer 910 and the $L_{DC}$ output data stream from bandwidth synthesis stage 802-C is applied to the minus (−) input of algebraic summer 910. Each pixel of the output data stream from summer 910 has a value D equal to the difference between the values of the corresponding pixels of the data streams applied, respectively, to the plus and minus inputs to summer 910. The output data stream from summer 910 is forwarded to the dividend A input of A/B divider 914 through element 912, which element 912 limits the value D of each pixel in the output data stream from summer 910 into the absolute value thereof. The $L_{AC}$ output data stream from bandwidth synthesis stage 802-C is applied to the divisor B input of A/B divider 914, thereby providing a normalized value S for each pixel of the output data stream from divider 914, where $0 \geq S \geq 1$. 1−S computation means 916 performs the function of subtracting each normalized pixel value S of the output data stream from divider 914 from the fixed value "1". Multiplier 918 multiplies the value of each pixel of the output data stream from 1−S computation means 916 by a user-controlled, variable-value V. Each pixel of the output data stream from multiplier 918, which has a value between a minimum value 0 and a maximum value R, is applied to the multiplier input of multiplier 920 and the value of its corresponding pixel of the $HP_{k-1}$ data stream input to bandwidth synthesis stage 802a-K is applied to the multiplicand input of multiplier 920. Summer 922 adds the value of each pixel of the product data stream output from multiplier 920 to the value of its corresponding pixel of the $GI_{k-1}$ data stream input to bandwidth synthesis stage 802a-K to thereby derive from summer 922 the value of the corresponding pixel of the $GI_k$ data stream output from bandwidth synthesis stage 802a-K.

Figure 9D:
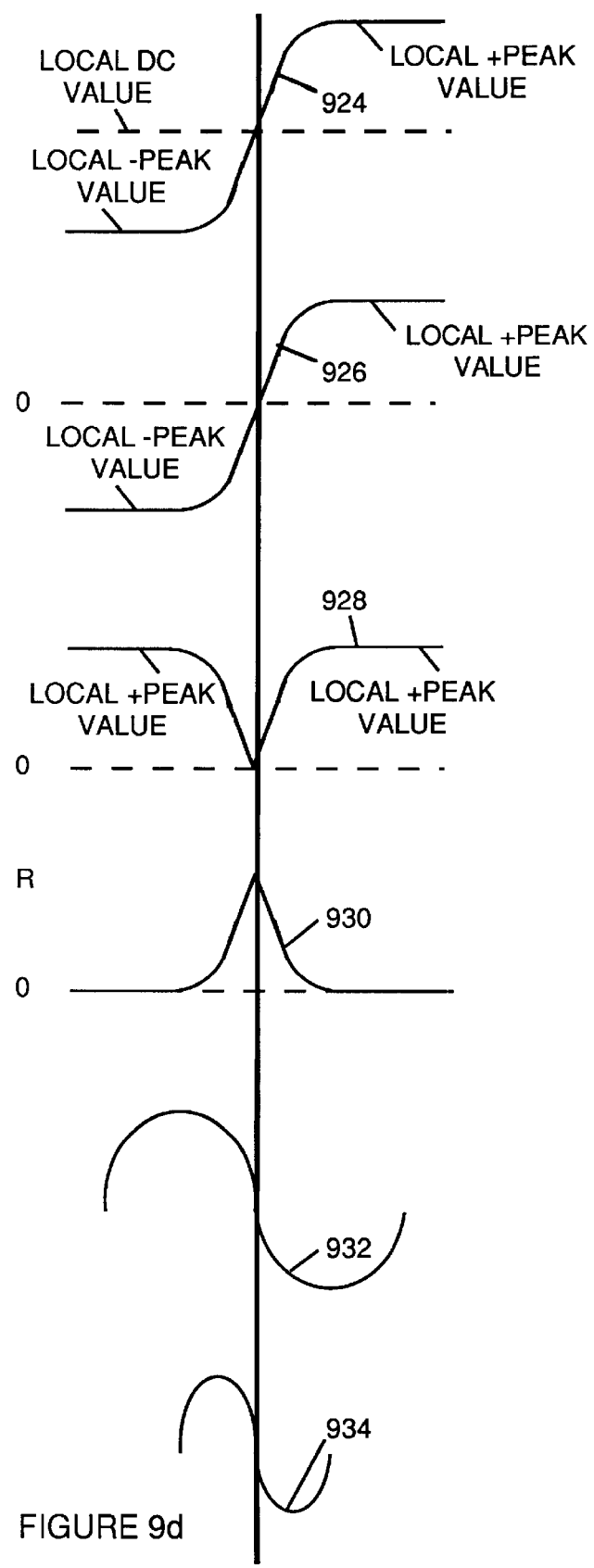
FIG. 9d is directed to an illustrative example of the functional operation of the structure shown in each of FIGS. 9a and 9b.

Reference is now made to FIG. 9d, which is directed to an illustrative example of the functional operation of the above-described structure shown in FIG. 9a.

Assume that a brick-wall edge, having any given angular orientation, separates a relatively darker (i.e., dimmer) area to the left of the brick-wall edge of the original image from a relatively lighter (i.e., brighter) area to the right of the brick-wall edge. 2D interpolation of pixels by interpolators 706L and 706H of FIG. 7 in the local region of the image originally occupied by the brick-wall results in a blurring of this local edge when the LP and HP interpolated data streams are combined into a full-bandwidth interpolated $GI_{k-1}$ data stream, in a manner similar to that described above in connection with the sampled waveform shown in FIG. 2.

Referring to FIG. 9d, waveform 924 illustrates such a blurred local edge (although the samples defining waveform 924 have been omitted in the showing of waveform 924) defined by interpolated pixels of a local part of the $GI_{k-1}$ data stream. The local +peak value of waveform 924 correspond closely to the local interpolated pixel values from interpolator $902_{MAX}$ and the local −peak value of waveform 924 correspond closely to the local interpolated pixel values from interpolator $902_{MIN}$. As shown, the local DC value, which is ½ way between the local+value and the −peak value of waveform 924, is equal to (local+peak value+the −peak value)/2. This is the local DC ($L_{DC}$) value that is computed by summer $904_S$ and multiplier 906. The local AC ($L_{AC}$), or the local dynamic range, of waveform 924 is equal to (local+peak value−the −peak value)/2. This is the very local AC ($L_{AC}$) value that is computed by summer $904_D$. It should be noted the structure for deriving both $L_{DC}$ and $L_{AC}$ is independent of both the $HP_{k-1}$ and $GI_{k-1}$ data stream inputs. Thus, this structure can be included in a common bandwidth synthesis stage 802-C that is capable of supplying the $L_{DC}$ and $L_{AC}$ data streams to each of the ordinal set of bandwidth synthesis stages 802a-1 . . . 802a-N.

As shown in FIG. 9a for the general case of bandwidth synthesis stage 802a-K, the value of each pixel of the $L_{DC}$ data stream is subtracted in algebraic summer 910 from the value of each corresponding pixel of the $GI_{k-1}$ data stream to derive the D-valued pixels of the output data stream from summer 910. The result, as shown in FIG. 9d by waveform 926, is to eliminate the local DC component, leaving only the local AC component. Waveform 928 shows the effect of passing such D-valued pixels through absolute-value derivation element 912 to derive the A dividend input to A/B divider 914. The value of the A dividend is normalized by dividing it by $L_{DC}$ applied to the B divisor input of A/B divider 914 to derive the value S for each data stream output pixel from A/B divider 914 and then the value thereof is subtracted from the fixed value "1" by 1−S computation means 916 followed by being multiplied under user control by a variable factor V to thereby derive pixel values that quickly rise from a zero value to a relatively high maximum value R and then as quickly fall back to a zero value, as indicated by waveform 930.

For a moment, assume the case in which bandwidth synthesis stage 802a-K is bandwidth synthesis stage 802a-1

(i.e., K=1). In that case, it is the $HP_0$ and $GI_0$ data streams that are applied as interpolated inputs to bandwidth synthesis stage 802a-1. As shown in FIGS. 7 and 8a, the $HP_0$ interpolated data stream (which is identical to the HP' data stream) forwarded as an input to bandwidth synthesis stage 802a-1 is derived, either directly or indirectly through filter 710+ or 710−, from the interpolated output data stream from interpolator 706H. Similarly, the $GI_0$ full-bandwidth data stream is derived through the combined LP' and HP' data streams from the interpolated output data streams from interpolators 706L and 706H. The highest H and V frequency components of each of these interpolated output data streams from interpolators 706L and 706H correspond to the perimeter of square area 206a of block 400 of FIG. 4. Waveform 932 of FIG. 9d shows the period of one cycle of such a highest frequency component. Waveform 934 represents the highest frequency component of the interpolated data stream output from multiplier 920 of FIG. 9a for the case in which each pixel value of the $HP_0$ interpolated data stream multiplicand input thereto (represented by waveform 932) is multiplied by each corresponding 0−R pixel value of the interpolated data stream multiplier input thereto (represented by waveform 930). It is obvious from FIG. 9d that the period of one cycle of the highest frequency component represented by waveform 934 is shorter than the highest frequency component represented by waveform 932. Therefore, it is plain that the interpolated data stream output from multiplier 920 includes synthetically-derived frequency components that are higher than the highest frequency component in either the $HP_0$ or $GI_0$ data stream applied as an interpolated input to bandwidth synthesis stage 802a-1. These synthetically-derived frequency components included in each of the pixel values of interpolated data stream output from multiplier 920 are then added to the corresponding pixel value of the interpolated $GI_0$ data stream by summer 922 to derive the pixel values of the interpolated $GI_1$ data stream at the output from summer 922. Thus, the frequency bandwidth of interpolated $GI_1$ data stream, which constitutes the full-bandwidth output from bandwidth synthesis stage 802a-1, is extended in frequency with respect to the frequency bandwidth of interpolated $GI_0$ data stream, which constitutes the full-bandwidth input to bandwidth synthesis stage 802a-1. Put another way, interpolated $GI_1$ data stream includes frequency-extended synthetically-derived upper frequency components that now occupy at least part of the initially unoccupied portion 210 of square area 206 of block 400 of FIG. 4.

As known, in the Fourier analysis of the frequencies comprising an edge, each successive higher-frequency harmonic has a higher amplitude than its immediately preceding harmonic. To further frequency-extend the synthetically-derived upper frequency components, so that (1) the total of all the synthetically-derived upper frequency components occupy all of portion 210 of square area 206, as shown in block 402 of FIG. 4 and (2) the full bandwidth occupies the entire square area 206, as shown in block 404 of FIG. 4, the pixel values of the interpolated $GI_1$ data stream output from bandwidth synthesis stage 802a-1 are serially passed through each of the set of ordinally-arranged HP filters 804-1 . . . 804-(N−1) and each of the ordinally-arranged set of bandwidth synthesis stages 802a-2 . . . 802a-N to finally derive interpolated $GI_N$ data stream output from bandwidth synthesis stage 802a-N, as shown in FIG. 8a. In practice, a value for N of three is usually sufficient to achieve a bandwidth-extended enlarged digital image with (1) substantially brick-wall edges, as shown in FIG. 4a and (2) smooth (i.e., not jagged or staircase-shaped) diagonally-oriented edges, thereby resulting in a significant improvement in the appearance of an enlarged digital image.

Each of the set of ordinally-arranged HP filters 804-1 . . . 804-(N−1) is preferably implemented by subtracting the value of each pixel of the data stream output of a 3×3 LP filter from the corresponding value of each pixel of the data stream input to that HP filter, by means similar to those shown in FIG. 7a. While the use of HP filters in the first preferred embodiment of synthetic bandwidth extension means 602 shown in FIG. 8a is desirable, the need for HP filters is not essential to the implementation of synthetic bandwidth extension means 602. The not insignificant cost of a set of N−1 HP filters can be saved, with only a slight degradation in performance of synthetic bandwidth extension means 602, by employing the simplified second preferred embodiment of synthetic bandwidth extension means 602 shown in FIG. 8b, instead of the first preferred embodiment of synthetic bandwidth extension means 602 shown in FIG. 8a.

FIG. 8b replaces the ordinally-arranged set of bandwidth synthesis stages 802a-1 . . . 802a-N with the ordinally-arranged set of bandwidth synthesis stages 802b-1 . . . 802b-N and replaces the set of ordinally-arranged HP filters 804-1 . . . 804-(N−1) with the ordinally-arranged set of summers 806-1 . . . 806-N. In other respects, the structure of FIG. 8b is the same as that of FIG. 8a.

FIG. 9b shows the preferred embodiment of the structure of common bandwidth synthesis stage 802-C and the structure of bandwidth synthesis stage 802b-K, where N≧K≧1. It can be seen that all of the structure of common bandwidth synthesis stage 802-C of FIG. 9b is identical to the above-described structure of common bandwidth synthesis stage 802-C of FIG. 9a. Further, the structure of bandwidth synthesis stage 802b-K differs from of bandwidth synthesis stage 802a-K only to the extent that (1) summer 922 of bandwidth synthesis stage 802a-K is omitted in bandwidth synthesis stage 802b-K, (2) the pixels of the data stream output from multiplier 920 constitutes the $COR_k$ (i.e., correction) output from bandwidth synthesis stage 802bK, and (3) while, as in FIG. 9a, the value of the pixels of the $HP_0$ data stream remain the multiplicand input to multiplier 920 for the case in which K=1, the multiplicand input to multiplier 920 for the case in which N≧K≧2 is $COR_{k-1}$.

It is apparent from the above description of FIGS. 8a, 8b, 9a and 9b that synthetic bandwidth extension means 602 generates the added high frequency components that were absent in the bandwidth defined by the pixel values of the data stream input to means 602 by processing solely the pixel values of this data stream input in real time (i.e., without any need for supplying extrinsic high frequency information to synthetic bandwidth extension means 602).

The above-described preferred embodiments of the present invention shown in FIGS. 8a, 8b, 9a and 9b employ a single common bandwidth synthesis stage (incorporating the structure shown in FIG. 9a or in FIG. 9b) to derive the local AC interpolated-sample data stream $L_{AC}$ and the local DC interpolated-sample data stream $L_{DC}$ which are applied as inputs to each of bandwidth synthesis stages 802a-1, 802a-2 . . . 802a-N of FIG. 8a or bandwidth synthesis stages 802b-1, 802b-2 . . . 802b-N of FIG. 8b. However, it may be desirable, in the implementation of the present invention employing VLSI chip technology, to incorporate a duplicate of the common bandwidth synthesis structure shown in FIG. 9a or in FIG. 9b in each one of bandwidth synthesis stages 802a-1, 802a-2 . . . 802a-N or bandwidth synthesis stages 802b-1, 802b-2 . . . 802b-N, rather than employing a single common bandwidth synthesis stage.

It has been found that a problem arises in the case when it is desired to enlarge an image defining text (i.e., alphanumeric characters) material, rather than pictorial material, by a given improper-fraction factor that is smaller in value than two. The reason this problem arises is that there are too few interpolated pixel values defining the distinct boundary edge of an alphanumeric character that result from an improper-fraction interpolation factor smaller in value than two by interpolators 706L and 706H of FIG. 7. The solution to this problem is to (1) first employ interpolators 706L and 706H to provide an improper-fraction interpolation factor of a given value of at least two, and then (2) pass the bandwith-extended image output of either FIG. 8a or FIG. 8b, as the case may be, through image-size reduction means 808, shown in FIG. 8c, in accordance with the teachings of our aforesaid earlier U.S. Pat. No. 5,355,328, to thereby derive pixel values of the data stream output from means 808 that define an image enlarged by the given improper-fraction factor that is smaller in value than two. For instance, consider the case in which 2D M/N interpolators 706L and 706H of FIG. 7 upsample the pixel data stream inputs thereto by a factor equal to $2^c$ times the given improper-fraction factor, where C is a positive integer. If, for example, the given improper-fraction is 1.6 and C is equal to 1, the sampling frequency of the pixel data stream outputs from interpolators 706L and 706H will be 3.2 times the sampling frequency of the pixel data stream inputs to interpolators 706L and 706H. Thus, in the above case, image-size reduction means 808, as known, may comprise a digital octave filter followed by pixel decimation means for reducing the sampling frequency of the pixel data stream outputs from interpolators 706L and 706H by a factor of $2^c$ (i.e., a factor of 2 in the above example to thereby derive a pixel data stream output from means 808 having a sampling frequency which is) 1.6 times the sampling frequency of the pixel data stream inputs to interpolators 706L and 706H.

The improved appearance of the enlarged bandwidth-extended image emerging as the output from synthetic bandwidth extension means 602 can be further improved by passing it through optional synthetic perspective means 604 to add naturalness and remove noise that can become visible in constant-luminance areas. More specifically, synthetic perspective means 604 produces a slightly skewed highpass image that is offset to the right and downward positions relative to the input image. The effect of adding such a signal back to the input image applied to synthetic perspective means 604 is to produce a drop shadow effect about the output image from synthetic perspective means 604. This adds a dimension of photo realism to the image, because many images, particularly scanned images, look flat and two-dimensional. This process makes images look more 3D by adding a component of depth. In this regard, FIG. 10, as an example, shows the appearance of a drop shadow effect on a rectangular object 1000 in the display of the output image from synthetic perspective means 604.

The preferred digital embodiment of synthetic perspective means 604 shown in FIG. 10a comprises 3×3 non-separable filter 1002, non-linear coring means 1004, multiplier 1006 and summer 1008. Each of the pixel values of the bandwidth-extended image output data stream is applied both as an input to filter 1002 and as a first input to summer 1008. The value of each pixel of the output data stream from filter 1002 is applied as an input to coring means 1004. The value of each pixel in the output data stream from coring means 1004 is multiplied in multiplier 1006 by a user-controlled adjustable gain factor G and then is applied as a second input to summer 1008. The pixel values of the processed sampled image output data stream from summer 1008 constitutes the output from synthetic perspective means 604.

As shown in FIG. 10b, the highpass filter function F of filter 1002 comprises a 3×3 slightly-skewed array of coefficient values that are offset to the right and downward. This function F produces a data stream of pixel values from the output from filter 1002 that defines a highpass image that is offset to the right and downward in position relative to the position of the full-bandwidth image defined by the pixel values of the input data stream to filter 1002.

Because the highpass output data stream from filter 1002 contains most of the visible image noise, which is sequentially made more visible when the pixel values of this data stream is added back to the pixel values of the full-bandwidth image data stream in summer 1008, non-linear coring means 1004 is employed to reduce this perceived increase in noise. The non-linear output-input relationship of the coring provided by means 1004 may be as simple as that shown in FIG. 10c (where (1) the output pixel value is zero if the absolute value of the pixel value is equal to or less than the given value T and (2) the output pixel value is equal to the input pixel value if the absolute value of the pixel value is more than the given value T. Instead, more sophisticated mappings that employ nonlinear coring, known in the art, may be employed. However, the particular noise function is not critical because the purpose of the structure of synthetic perspective means 604 shown in FIG. 10a is to add back only a small manipulated highpass rendition of the input image to the input image itself in summer 1008—not to change the fundamental spectral balance of the input image. Further, the user-controlled gain G by multiplier 1006 allows the user the ability to insert as much perspective effect in the viewed output image from synthetic perspective means 604 as he or she finds comfortable.

While the present invention is primarily directed to the case of synthetically extending the bandwidth of the oversampled interpolated data stream of an enlarged image, there is also the case in which the original-image raster-scanned data stream input is substantially oversampled with respect to the highest frequency component of the original image. In this latter case, synthetic bandwidth extension means 602 may be employed to generate components higher in frequency than this highest frequency component of the original image and then add these generated high-frequency components to the original image, in the manner described above in connection with FIGS. 4 and 4a, to derive a bandwidth-extended image output data stream from means 602.

Further, while the present invention is primarily directed to the above-described case in which the value of each data-stream pixel sample is expressed in digital form, the principles of the present invention apply with equal force to the case in which the value of each data-stream pixel sample is expressed in analog form.

What is claimed is:

1. Image processing apparatus for extending the frequency bandwidth of an original video image that is spatially-sampled at a first sampling frequency and is represented by an input data stream comprising successive pixel values that define said frequency bandwidth; said apparatus comprising:

first means for deriving, from said pixel values of said input data stream, (1) a first data stream that comprises successive pixel values of a first image component that has substantially the same frequency bandwidth as said original video image and is spatially sampled at a second sampling frequency which is sufficiently higher than the highest frequency component of said frequency bandwidth of said original video image to result in said first image component being significantly oversampled, and (2) a second data stream that comprises synthetically-derived successive correction-waveform pixel values of a second image component that is spatially-sampled at said second sampling frequency, said synthetically-derived successive correction-waveform pixel values defining spatial frequencies of said second image component that are higher in frequency than said highest frequency component of said original video image; and second means for summing the corresponding pixel values of said first and second data streams to thereby derive a third data stream of successive pixel values that define the frequency-extended bandwidth of an output video image from said second means with respect to said frequency bandwidth of said original video image.

2. The image processing apparatus defined in claim 1, wherein said processing apparatus is digital processing apparatus and each of said successive pixel values of said input, first, second and third data streams is represented in digital form.

3. The image processing apparatus defined in claim 1, wherein:

said first sampling frequency is sufficiently higher than the highest frequency component of said frequency bandwidth of said original video image to result in said original video image being significantly oversampled; and said first and second sampling frequencies being equal to one another.

4. The image processing apparatus defined in claim 1, wherein said first means and second means together comprise:

2D interpolation means responsive to said input data stream applied thereto for upsampling and interpolating the pixel values of said input data stream to derive interpolated pixel values defining an image enlarged in size with respect to the size of said original video image at said second spatial sampling frequency; and synthetic bandwidth extension means responsive to the application thereto of said interpolated pixel values derived by said 2D interpolation means for deriving said pixel values of said third data stream that define the frequency-extended bandwidth of an enlarged output video image from said second means.

5. The image processing apparatus defined in claim 4, wherein said apparatus further comprises:

synthetic perspective means responsive to the application thereto of said pixel values of said third data stream that define said second-means-output enlarged image for deriving a final enlarged image having a drop shadow effect.

6. The image processing apparatus defined in claim 5, wherein said synthetic perspective means comprises:

a 3×3 non-separable highpass filter having a skewed filter function to which said third data stream of pixel values that define said second-means-output enlarged image are applied to thereby derive a fourth data stream of pixel values as an output from said 3×3 non-separable highpass filter;

a non-linear coring means to which said fourth data stream of pixel values are applied for coring each of pixel value of said fourth data stream to thereby derive a fifth data stream of pixel values as an output from said non-linear coring means;

multiplying means to which said fifth data stream of pixel values are applied for multiplying the each pixel value of fifth data by a user-controlled gain factor to thereby derive a sixth data stream of pixel values as an output from said multiplying means; and summer means to which said sixth data stream of pixel values are applied for summing corresponding pixel values of said sixth data stream and said third data stream to thereby derive a seventh data stream of pixel values as an output from said summer means that defines said final enlarged image having a drop shadow effect.

7. The image processing apparatus defined in claim 6, wherein:

said 3×3 non-separable highpass filter has the skewed filter function F depicted in FIG. 10*b*; and said coring means, in response to each pixel of said fourth data stream input thereto that that has an absolute-value equal to or less than a given value T, derives a fifth data-stream output pixel value of zero and, in response to each pixel of said fourth data stream input thereto that that has an absolute-value greater than said given value T, derives a fifth data-stream output pixel value equal to the value of its corresponding pixel of said fourth data stream.

8. The image processing apparatus defined in claim 4, wherein said 2D interpolation means comprises:

a bandsplit filter responsive to the pixel values of said input data stream applied thereto for splitting said frequency bandwidth of said original video image into a lowpass data stream of pixel values having said first sampling frequency and a highpass data stream of pixel values having said first sampling frequency;

means including a first 2D interpolator responsive to the pixel values of said lowpass data stream applied thereto for forwarding a lowpass data stream of interpolated pixel values having said second sampling frequency as a first input to said synthetic bandwidth extension means;

means including a second 2D interpolator responsive to the pixel values of said highpass data stream applied thereto for forwarding a highpass data stream of interpolated pixel values having said second sampling frequency as a second input to said synthetic bandwidth extension means; and means for forwarding the pixel values of said input data stream having said first sampling frequency as a third input to said synthetic bandwidth extension means.

9. The image processing apparatus defined in claim 8, wherein each of said first and second 2D interpolators comprises, in series, separate vertical and horizontal 1D interpolators; and wherein said means including said second 2D interpolator further comprises:

a +45° lowpass filter;

a −45° lowpass filter;

means for applying the highpass data stream of interpolated pixel values from said second 2D interpolator as an input data stream to each of said +45° lowpass filter and said −45° lowpass filter;

a maximum absolute value detector having first, second and third data streams of pixel values applied as inputs thereto for deriving the pixel values of an output data stream therefrom, wherein said maximum absolute value detector passes to its output data stream the pixel value of that one of each successive group of corresponding pixel values of said first, second and third data streams which has the maximum absolute value of that group, said output data stream from said maximum absolute value detector constituting said highpass data stream of interpolated pixel values forwarded as a second input to said synthetic bandwidth extension means;

means for applying the highpass data stream of interpolated pixel values from said second 2D interpolator as said first data stream input to said a maximum absolute value detector;

means for applying an output data stream of pixel values from said +45° lowpass filter as said second data stream input to said a maximum absolute value detector; and means for applying an output data stream of pixel values from said −45° lowpass filter as said third data stream input to said a maximum absolute value detector.

10. The image processing apparatus defined in claim 8, wherein said synthetic bandwidth extension means comprises:

an ordinal set of bandwidth synthesis stages 1 . . . N, where N is a given positive integer;

means responsive to said third input to said synthetic bandwidth extension means for deriving a data stream of local DC pixel values and a data stream of local AC pixel values that are applied, respectively, as $L_{DC}$ and $L_{AC}$ data-stream inputs to each of bandwidth synthesis stages 1 . . . N;

means for applying solely said second input to said synthetic bandwidth extension means as a highpass data-stream input to bandwidth synthesis stage 1 and applying the sum of said first and second inputs to said synthetic bandwidth extension means as a full-bandwidth data-stream input to bandwidth synthesis stage 1; and means for forwarding the pixel values of at least one output data stream from each one of bandwidth synthesis stages 1 . . . (N−1) as additional input data streams to its immediately following one of bandwidth synthesis stages 2 . . . N, whereby the pixel values of an output data stream from synthesis stage N constitutes said pixel values of said third data stream that define the frequency-extended bandwidth of said enlarged output video image.

11. The image processing apparatus defined in claim 10, wherein said means responsive to said third input to said synthetic bandwidth extension means comprises a common bandwidth synthesis stage that includes:

a 3×3 local region min-max detector responsive to each successive pixel of the third-input data stream applied as an input thereto for deriving, respectively, max value and min value output data streams of pixel values having said first sampling frequency, wherein the value of each one of the pixels of said max value output data stream corresponds to the value of that pixel of a 3×3 local region centered on that one of the pixels which has the maximum value, and wherein the value of each one of the pixels of said min value output data stream corresponds to the value of that pixel of a 3×3 local region centered on that one of the pixels which has the minimum value;

one 2D interpolator for upsampling and interpolating the pixel values of said max value data stream and another 2D interpolator for upsampling and interpolating the pixel values of said min value data stream to derive an output data stream of interpolated pixel values having said second sampling frequency from each of said one and other interpolators;

first computing means for computing the average value of the interpolated values of each successive pair of corresponding pixels of said output data stream from said one interpolator and said output data stream from said other interpolator to thereby derive said $L_{DC}$ data stream as the output from said first computing means; and second computing means for computing the difference value between the interpolated values of each successive pair of corresponding pixels of said output data stream from said one interpolator and said output data stream from said other interpolator to thereby derive said $L_{AC}$ data stream as the output from said second computing means.

12. The image processing apparatus defined in claim 11, wherein:

each one of bandwidth synthesis stages 1 . . . (N−1) derives a full-bandwidth data stream of pixel values as the output therefrom; and said means for forwarding the pixel values of at least one output data stream from each one of bandwidth synthesis stages 1 . . . (N−1) comprises (1) a separate highpass filter through which said full-bandwidth data-stream output of pixel values from each one of bandwidth synthesis stages 1 . . . (N−1) is forwarded as a highpass data-stream of pixel values input to its immediately following one of bandwidth synthesis stages 2 . . . N; and (2) means for directly forwarding said full-bandwidth data-stream of pixel values output from each one of bandwidth synthesis stages 1 . . . (N−1) as a full-bandwidth data-stream of pixel values input to its immediately following one of bandwidth synthesis stages 2 . . . N.

13. The image processing apparatus defined in claim 12, wherein each one of said bandwidth synthesis stages 1 . . . N comprises:

third computing means for computing the absolute value of the difference between each pixel value of said full-bandwidth data-stream input to that one of said bandwidth synthesis stages 1 . . . N from and the corresponding pixel value of said $L_{DC}$ data-stream input to that one of said bandwidth synthesis stages 1 . . . N to thereby derive an absolute-valued difference (|D|) data stream of pixel values as the output from said third computing means;

fourth computing means for dividing each pixel value of said |D| data stream of pixel values from the output from said third computing means by the corresponding pixel value of said $L_{AC}$ data-stream input to that one of said bandwidth synthesis stages 1 . . . N to thereby derive a normalized data stream (S) of pixel values as the output from said fourth computing means;

fifth computing means including means for subtracting each of the pixel values of said normalized data stream S at the output from said fourth computing means from a fixed value "1" to derive a data stream of pixel values at the output from said fifth computing means in which each pixel thereof has a value in a range that extends from a zero value to a maximum value R;

sixth computing means for multiplying each of the pixel values of said data stream from the output from said fifth computing means by the corresponding pixel value of each pixel value of said highpass data-stream input to that one of said bandwidth synthesis stages 1 . . . N to thereby derive a correction-waveform data stream of product pixel values as the output from said sixth computing means; and seventh computing means for summing corresponding pixel values of said full-bandwidth data-stream input to that one of said bandwidth synthesis stages 1 . . . N and said of correction-waveform data stream as the output from said seventh computing means, said output from said seventh computing means constituting said full-bandwidth data stream output from that one of said bandwidth synthesis stages 1 . . . N;

whereby said full-bandwidth data stream output from said bandwidth synthesis stage N constitutes said third data stream of pixel values that define the frequency-extended bandwidth of said enlarged output video image.

14. The image processing apparatus defined in claim 13, wherein:

said fifth computing means further includes a multiplier for multiplying the magnitude of each of the pixel values of said normalized data stream S by a user-controlled variable factor V.

15. The image processing apparatus defined in claim 13, wherein each of said first, second, one and other 2D interpolators comprises, in series, separate vertical and horizontal 1D interpolators; and wherein said means including said second 2D interpolator further comprises:

a +45° lowpass filter;

a −45° lowpass filter;

means for applying the highpass data stream of interpolated pixel values from said second 2D interpolator as an input data stream to each of said +45° lowpass filter and said −45° lowpass filter;

a maximum absolute value detector having first, second and third data streams of pixel values applied as inputs thereto for deriving the pixel values of an output data stream therefrom, wherein said maximum absolute value detector passes to its output data stream the pixel value of that one of each successive group of corresponding pixel values of said first, second and third data streams which has the maximum absolute value of that group, said output data stream from said maximum absolute value detector constituting said highpass data stream of interpolated pixel values forwarded as a second input to said synthetic bandwidth extension means;

means for applying the highpass data stream of interpolated pixel values from said second 2D interpolator as said first data stream input to said a maximum absolute value detector;

means for applying an output data stream of pixel values from said +45° lowpass filter as said second data stream input to said a maximum absolute value detector; and means for applying an output data stream of pixel values from said −45° lowpass filter as said third data stream input to said a maximum absolute value detector.

16. The image processing apparatus defined in claim 13, wherein each of said first, second, one and other 2D interpolators upsamples and interpolates the pixel values of the data stream applied as an input thereto by an improper fraction factor M/N, where N is a positive integer having a first given value and M is a second positive integer having a second given value larger in value than said first given value.

17. The image processing apparatus defined in claim 16, wherein M=$2^c$P, where (1) C is a positive integer and (2) P is a positive integer having a third given value larger in value than said first given value such that P/N is an improper fraction having a certain value between one and two; and wherein said image processing apparatus further comprises:

image-size reduction means, including a digital octave filter followed by pixel decimation means, responsive to said third data stream of interpolated pixel values having said second sampling frequency applied thereto for deriving a fourth data stream of interpolated pixel values having a third sampling frequency which is reduced by a factor of $2^c$ with respect to said second sampling frequency of said third data stream of interpolated pixel values;

whereby said sampling frequency of said fourth data stream of interpolated pixel values is equal to said P/N improper fraction having said certain value between one and two times said first sampling frequency of said original video image.

18. The image processing apparatus defined in claim 11, wherein:

each one of bandwidth synthesis stages 1 . . . N derives (1) a full-bandwidth data stream of pixel values as a first output therefrom which is the same as that full-bandwidth data stream of pixel values applied as the input thereto, and (2) a correction-waveform data stream of pixel values as a second output therefrom;

said means for forwarding the pixel values of at least one output data stream from each one of bandwidth synthesis stages 1 . . . (N−1) comprises a separate summer for summing corresponding pixels of said full-bandwidth data-stream first output and said correction-waveform second output from of bandwidth synthesis stages 1 . . . (N−1) to derive a full-bandwidth data-stream of pixel values as the output from the summer of that one of bandwidth synthesis stages 1 . . . (N−1) which is forwarded as said full-bandwidth data-stream input to its immediately following one of bandwidth synthesis stages 2 . . . N; and an additional summer for summing corresponding pixels of said full-bandwidth data-stream first output and said correction-waveform second output from of bandwidth synthesis stage N to derive a full-bandwidth data-stream of pixel values as the output from said additional summer;

whereby the output from said additional summer constitutes said third data stream of pixel values that define the frequency-extended bandwidth of said enlarged output video image.

19. The image processing apparatus defined in claim 18, wherein each one of said bandwidth synthesis stages 1 . . . N comprises:

third computing means for computing the absolute value of the difference between each pixel value of said full-bandwidth data-stream input to that one of said bandwidth synthesis stages 1 . . . N from and the corresponding pixel value of said $L_{DC}$ data-stream input to that one of said bandwidth synthesis stages 1 . . . N to thereby derive an absolute-valued difference (|D|) data stream of pixel values as the output from said third computing means;

fourth computing means for dividing each pixel value of said |D| data stream of pixel values from the output from said third computing means by the corresponding pixel value of said $L_{AC}$ data-stream input to that one of said bandwidth synthesis stages 1 . . . N to thereby derive a normalized data stream (S) of pixel values as the output from said fourth computing means;

fifth computing means including means for subtracting each of the pixel values of said normalized data stream S at the output from said fourth computing means from a fixed value "1" to derive a data stream of pixel values at the output from said fifth computing means in which each pixel thereof has a value in a range that extends from a zero value to a maximum value R;

sixth computing means for multiplying each of the pixel values of said data stream from the output from said fifth computing means by the corresponding pixel value of each pixel value of said highpass data-stream input to that one of said bandwidth synthesis stages 1 . . . N to thereby derive a correction-waveform data stream of product pixel values as the output from said sixth computing means constituting said correction-waveform data stream second output from that one of said bandwidth synthesis stages 1 . . . N; and seventh means for forwarding the pixel values of said full-bandwidth data-stream input to that one of said bandwidth synthesis stages 1 . . . N to said full-bandwidth data-stream of pixel values output from that one of said bandwidth synthesis stages 1 . . . N.

20. The image processing apparatus defined in claim 19, wherein:

said fifth computing means further includes a multiplier for multiplying the magnitude of each of the pixel values of said normalized data stream S by a user-controlled variable factor V.

21. The image processing apparatus defined in claim 19, wherein each of said first, second, one and other 2D interpolators comprises, in series, separate vertical and horizontal 1D interpolators; and wherein said means including said second 2D interpolator further comprises:

a +45° lowpass filter;

a −45° lowpass filter;

means for applying the highpass data stream of interpolated pixel values from said second 2D interpolator as an input data stream to each of said +45° lowpass filter and said −45° lowpass filter;

a maximum absolute value detector having first, second and third data streams of pixel values applied as inputs thereto for deriving the pixel values of an output data stream therefrom, wherein said maximum absolute value detector passes to its output data stream the pixel value of that one of each successive group of corresponding pixel values of said first, second and third data streams which has the maximum absolute value of that group, said output data stream from said maximum absolute value detector constituting said highpass data stream of interpolated pixel values forwarded as a second input to said synthetic bandwidth extension means;

means for applying the highpass data stream of interpolated pixel values from said second 2D interpolator as said first data stream input to said a maximum absolute value detector;

means for applying an output data stream of pixel values from said +45° lowpass filter as said second data stream input to said a maximum absolute value detector; and means for applying an output data stream of pixel values from said −45° lowpass filter as said third data stream input to said a maximum absolute value detector.

22. The image processing apparatus defined in claim 19, wherein each of said first, second, one and other 2D interpolators upsamples and interpolates the pixel values of the data stream applied as an input thereto by an improper fraction factor M/N, where N is a positive integer having a first given value and M is a second positive integer having a second given value larger in value than said first given value.

23. The image processing apparatus defined in claim 22, wherein M=2$^C$P, where (1) C is a positive integer and (2) P is a positive integer having a third given value larger in value than said first given value such that P/N is an improper fraction having a certain value between one and two; and wherein said image processing apparatus further comprises:

image-size reduction means, including a digital octave filter followed by pixel decimation means, responsive to said third data stream of interpolated pixel values having said second sampling frequency applied thereto for deriving a fourth data stream of interpolated pixel values having a third sampling frequency which is reduced by a factor of $2^c$ with respect to said second sampling frequency of said third data stream of interpolated pixel values;

whereby said sampling frequency of said fourth data stream of interpolated pixel values is equal to said P/N improper fraction having said certain value between one and two times said first sampling frequency of said original video image.

24. Image processing apparatus for synthetically adding a drop shadow effect to an input video image to thereby enhance perspective in the display of the resulting processed video image, wherein said input video image is spatially-sampled at a given sampling frequency and is represented by an input data stream comprising successive pixel values, a video image; said image processing apparatus comprising:

a 3×3 non-separable highpass filter having a skewed filter function to which said pixel values of said input data stream representing said input video image are applied to thereby derive a first data stream of pixel values as an output from said 3×3 non-separable highpass filter;

a non-linear coring means to which said first data stream of pixel values are applied for coring each of pixel value of said first data stream to thereby derive a second data stream of pixel values as an output from said non-linear coring means;

multiplying means to which said second data stream of pixel values are applied for multiplying the each pixel value of second data by a user-controlled gain factor to thereby derive a third data stream of pixel values as an output from said multiplying means; and summer means to which said third data stream of pixel values are applied for summing corresponding pixel values of said third data stream and said input data stream to thereby derive a fourth data stream of pixel values as an output from said summer means that defines said processed video image having a drop shadow effect.

25. The image processing apparatus defined in claim 24, wherein:

said 3×3 non-separable highpass filter has the skewed filter function F depicted in FIG. 10*b;* and said coring means, in response to each pixel of said first data stream input thereto that that has an absolute-value equal to or less than a given value T, derives a second data-stream output pixel value of zero and, in response to each pixel of said first data stream input thereto that that has an absolute-value greater than said given value T, derives a second datastream output pixel value equal to the value of its corresponding pixel of said first data stream.

* * * * *